(12) United States Patent
Sergyeyenko et al.

(10) Patent No.: US 8,519,861 B2
(45) Date of Patent: Aug. 27, 2013

(54) TOOL SYSTEM WITH MOUNT CONFIGURED TO BE REMOVABLY COUPLED TO A SURFACE

(75) Inventors: Oleksiy Sergyeyenko, Ottawa (CA); Christopher J. Murray, Baltimore, MD (US); Michael L. Agronin, Owings Mills, MD (US)

(73) Assignee: Black & Decker Inc., Newark, DE (US)

( * ) Notice: Subject to any disclaimer, the term of this patent is extended or adjusted under 35 U.S.C. 154(b) by 389 days.

(21) Appl. No.: 12/886,153

(22) Filed: Sep. 20, 2010

(65) Prior Publication Data

US 2012/0068852 A1 Mar. 22, 2012

(51) Int. Cl.
G08B 21/00 (2006.01)

(52) U.S. Cl.
USPC .................. 340/689; 340/825.25; 340/5.32

(58) Field of Classification Search
USPC ............... 340/689, 690, 686.5, 686.6, 691.6, 340/825.23, 825.24, 825.25, 5.32, 692
See application file for complete search history.

(56) References Cited

U.S. PATENT DOCUMENTS

| | | | |
|---|---|---|---|
| 2,711,030 A | 6/1955 | Drew et al. | |
| 4,079,521 A | 3/1978 | Uhorczak | |
| 4,110,609 A | 8/1978 | Beer | |
| 4,164,077 A | 8/1979 | Thomas | |
| 4,167,818 A | 9/1979 | Cantarella et al. | |
| 4,182,046 A | 1/1980 | Ludlow et al. | |
| 4,565,010 A | 1/1986 | Herman | |
| 4,574,491 A | 3/1986 | Vining | |
| 4,590,680 A | 5/1986 | Hanchett et al. | |
| 4,625,423 A | 12/1986 | Sackett | |
| 4,677,473 A * | 6/1987 | Okamoto et al. | 348/126 |
| 4,827,624 A | 5/1989 | Franklin et al. | |
| RE32,962 E | 6/1989 | Tudek | |
| 4,924,597 A | 5/1990 | Tursi | |
| 4,932,132 A | 6/1990 | Baker et al. | |
| 5,020,232 A | 6/1991 | Whiteford | |
| 5,031,329 A | 7/1991 | Smallidge | |
| 5,199,177 A | 4/1993 | Hutchins et al. | |
| 5,313,713 A | 5/1994 | Heger et al. | |
| 5,537,201 A | 7/1996 | Kumagai et al. | |
| 5,561,911 A | 10/1996 | Martin | |
| 5,575,073 A | 11/1996 | von Wedemayer | |
| 5,592,745 A | 1/1997 | Heger et al. | |
| 5,604,987 A | 2/1997 | Cupp | |
| 5,673,492 A | 10/1997 | Williams | |
| 6,037,874 A | 3/2000 | Heironimus | |
| 6,058,617 A | 5/2000 | Nadu | |
| 6,133,996 A | 10/2000 | Plumb et al. | |
| 6,237,235 B1 | 5/2001 | Feist et al. | |
| 6,360,446 B1 | 3/2002 | Bijawat et al. | |
| 6,663,077 B2 | 12/2003 | Zou | |
| D498,151 S | 11/2004 | Cook | |
| 6,836,972 B2 | 1/2005 | Drahos et al. | |
| 6,839,974 B1 | 1/2005 | Hitchcock | |

(Continued)

FOREIGN PATENT DOCUMENTS

| | | |
|---|---|---|
| DE | 3205206 A1 | 8/1983 |
| DE | 4402347 A1 | 8/1995 |

(Continued)

*Primary Examiner* — Daniel Previl
(74) *Attorney, Agent, or Firm* — Harness, Dickey & Pierce, P.L.C.

(57) ABSTRACT

A tool system with a mount configured to be removably coupled to a surface.

24 Claims, 7 Drawing Sheets

(56) References Cited

U.S. PATENT DOCUMENTS

| | | | |
|---|---|---|---|
| 6,874,739 | B1 | 4/2005 | Gregory |
| 6,951,061 | B1 | 10/2005 | Rosetti |
| D511,111 | S | 11/2005 | Malard et al. |
| 7,027,480 | B2 | 4/2006 | Marshall et al. |
| 7,066,434 | B2 | 6/2006 | Kwok |
| 7,137,209 | B2 | 11/2006 | Northern et al. |
| 7,174,647 | B2 | 2/2007 | Krantz et al. |
| 7,191,532 | B2 | 3/2007 | Long et al. |
| 7,243,431 | B2 | 7/2007 | Godwin |
| 7,278,218 | B2 | 10/2007 | Levine |
| 7,278,223 | B1 | 10/2007 | Dever et al. |
| 7,322,116 | B2 | 1/2008 | Long et al. |
| 7,322,118 | B2 | 1/2008 | Huang et al. |
| 7,350,305 | B2 | 4/2008 | Molitorisz |
| 7,447,565 | B2 * | 11/2008 | Cerwin .................. 700/279 |
| 7,610,689 | B1 | 11/2009 | Zhang |
| 7,690,124 | B1 | 4/2010 | Henry |
| 7,973,921 | B2 * | 7/2011 | Silberstein et al. ........ 356/237.3 |
| 2002/0069543 | A1 | 6/2002 | Owoc et al. |
| 2002/0166249 | A1 | 11/2002 | Liao |
| 2003/0218469 | A1 * | 11/2003 | Brazell et al. .................. 324/637 |
| 2004/0083615 | A1 | 5/2004 | Cotner |
| 2005/0022399 | A1 | 2/2005 | Wheeler et al. |
| 2005/0166410 | A1 | 8/2005 | Richter et al. |
| 2005/0210691 | A1 | 9/2005 | Solak |
| 2006/0021237 | A1 | 2/2006 | Marshall et al. |
| 2006/0185181 | A1 * | 8/2006 | Long et al. ..................... 33/286 |
| 2006/0226318 | A1 | 10/2006 | D'Amico |
| 2007/0101593 | A1 | 5/2007 | Jang |
| 2007/0193046 | A1 | 8/2007 | Arlinsky |
| 2007/0280501 | A1 * | 12/2007 | Walton .......................... 382/100 |
| 2008/0141546 | A1 * | 6/2008 | Strutt et al. ..................... 33/381 |
| 2009/0213447 | A1 * | 8/2009 | Hayashi ..................... 359/216.1 |

FOREIGN PATENT DOCUMENTS

| | | |
|---|---|---|
| DE | 10020638 A1 | 10/2001 |
| GB | 2319084 A | 5/1998 |
| JP | 2003194542 A | 7/2003 |

* cited by examiner

TOOL SYSTEM WITH MOUNT CONFIGURED TO BE REMOVABLY COUPLED TO A SURFACE

FIELD

The present disclosure relates to a tool system with a mount that is configured to be removably coupled to a surface.

BACKGROUND

This section provides background information related to the present disclosure which is not necessarily prior art.

U.S. Pat. No. 6,058,617 discloses a level with mercury switches that close when the level is in a level condition to cause a light to illuminate. U.S. Pat. No. 5,673,492 discloses a device employing a laser generator and a mirror for directing a beam of light generated by the laser generator. U.S. Pat. Nos. 4,827,624, 5,031,329 and 6,037,874 disclose electronic levels. U.S. Pat. No. 6,663,077 discloses a suction cup assembly.

There remains a need in the art for a tool system with a mount configured to be removably coupled to a surface.

SUMMARY

This section provides a general summary of the disclosure, and is not a comprehensive disclosure of its full scope or all of its features.

In one form, the present teachings provide a tool assembly that includes a frame, a bubble level and a light system. The frame defines a datum surface. The bubble level is mounted to the frame and is configured to indicate a levelness condition of the tool assembly. The light system is coupled to the frame and includes a controller, a light source and a diffuser. The controller is configured to selectively control the light source based on the levelness condition of the tool assembly such that the light source generates light of a first color when the levelness condition of the tool assembly is a first condition and generates light of a second, different color when the levelness condition of the tool assembly is a second, different condition. The diffuser receives light generated by the light source and is disposed about the bubble level such that the light generated by the light source emanates from three sides of the tool assembly in three adjacent orthogonal directions.

In another form, the present teachings provide a tool assembly that includes a frame, a bubble level and a light system. The frame defines a datum surface. The bubble level is mounted to the frame and is configured to indicate a levelness condition of the tool assembly. The light system is coupled to the frame and includes a light source and a light guide that backs the light source. The light guide is configured to receive light from the light source and direct the light into the bubble level such that the bubble level is illuminated over substantially all of its length.

In yet another form, the present teachings provide a tool assembly that includes a frame and a laser generator assembly. The frame defines a datum surface. The laser generator assembly has a laser generator, a mirror and a holder. The laser generator is mounted to the holder and is configured to output a beam of light. The mirror is mounted to the holder at a predetermined angle relative to the beam of light. The holder is pivotally mounted to the frame to permit the beam of light to be moved relative to the datum surface.

In still another form, the present teachings provide a tool assembly that includes a frame and an audio system that is coupled to the frame. The frame defines a datum surface. The audio system includes a controller and a speaker. The controller is configured to identify a levelness state of the tool assembly and to control the speaker in response thereto. The speaker generates a first tone when the tool assembly is in a first tipped state and a second, different tone when the tool assembly is in a second tipped state that is opposite the first tipped state. A level condition of the tool assembly is disposed between the first and second tipped states.

In another form, the present teachings provide a tool assembly that includes a base assembly and a tool. The base assembly has a suction cup and a mount that is coupled to the suction cup. The suction cup is configured to be releasably coupled to a surface. The tool has a mating mount that is configured to be engaged to the mount to releasably couple the tool to the base assembly. The mating mount cooperates with the mount to permit the tool to be translated relative to the suction cup after the mating mount is engaged to the mount.

In still another form, the present teachings provide a tool assembly that is configured to be removably coupled to a surface. The tool assembly includes a base assembly with a suction cup, a housing and a plunger. The housing is disposed about at least a portion of the suction cup. The plunger is translatable along an axis relative to the housing to deform the suction cup when the suction cup is abutted to the surface such that air disposed between the suction cup and the surface is expelled from the suction cup. The plunger has color-coded indicia indicative of a magnitude of an absolute pressure of air in the suction cup.

In a further form, the present disclosure provides a tool assembly that is configured to be removably coupled to a surface. The tool assembly includes a base assembly having a suction cup, a housing that is disposed about at least a portion of the suction cup, and an arm. The arm includes a yoke, which is pivotally coupled to the housing, an arm member, which is coupled to an end of the yoke opposite the housing, and a magnet that is fixedly coupled to the arm member.

In still another form, the present disclosure provides a tool assembly that is configured to be removably coupled to a surface. The tool assembly includes a base assembly having a suction cup and a housing that is disposed about at least a portion of the suction cup. The suction cup includes a cup structure and a release tab that extends radially outwardly therefrom. A hole is formed through the release tab and is configured to receive a push pin therethrough for mounting the base assembly to a workpiece.

In another form, the present disclosure provides a tool assembly that is configured to be removably coupled to a surface. The tool assembly includes a base assembly having a suction cup, a housing that is disposed about at least a portion of the suction cup, a mount and a push pin. The housing shrouds a portion of the suction cup. The mount defines an interior cavity and a pin mount that is disposed in the interior cavity. The pin mount is configured to releasably engage the push pin to permit the push pin to be coupled to the housing within the interior cavity.

In still another form, the present teachings provide a tool assembly with a base assembly and a tool. The base assembly has a mount. The tool has a laser generator and a mating mount that is configured to be engaged to the mount to releasably couple the tool to the base assembly. The mating mount cooperates with the mount to permit a first side of the tool to be selectively mounted to the base assembly to permit the laser generator to project a beam of light in a first direction relative to the base assembly. The mating mount also cooperates with the mount to permit a second, opposite side of the tool to be selectively mounted to the base assembly to permit the laser generator to project a beam of light in a second, opposite direction relative to the base assembly. The manner in which the mating mount engages the mount is the same when the first and second sides of the tool are mounted to the base assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
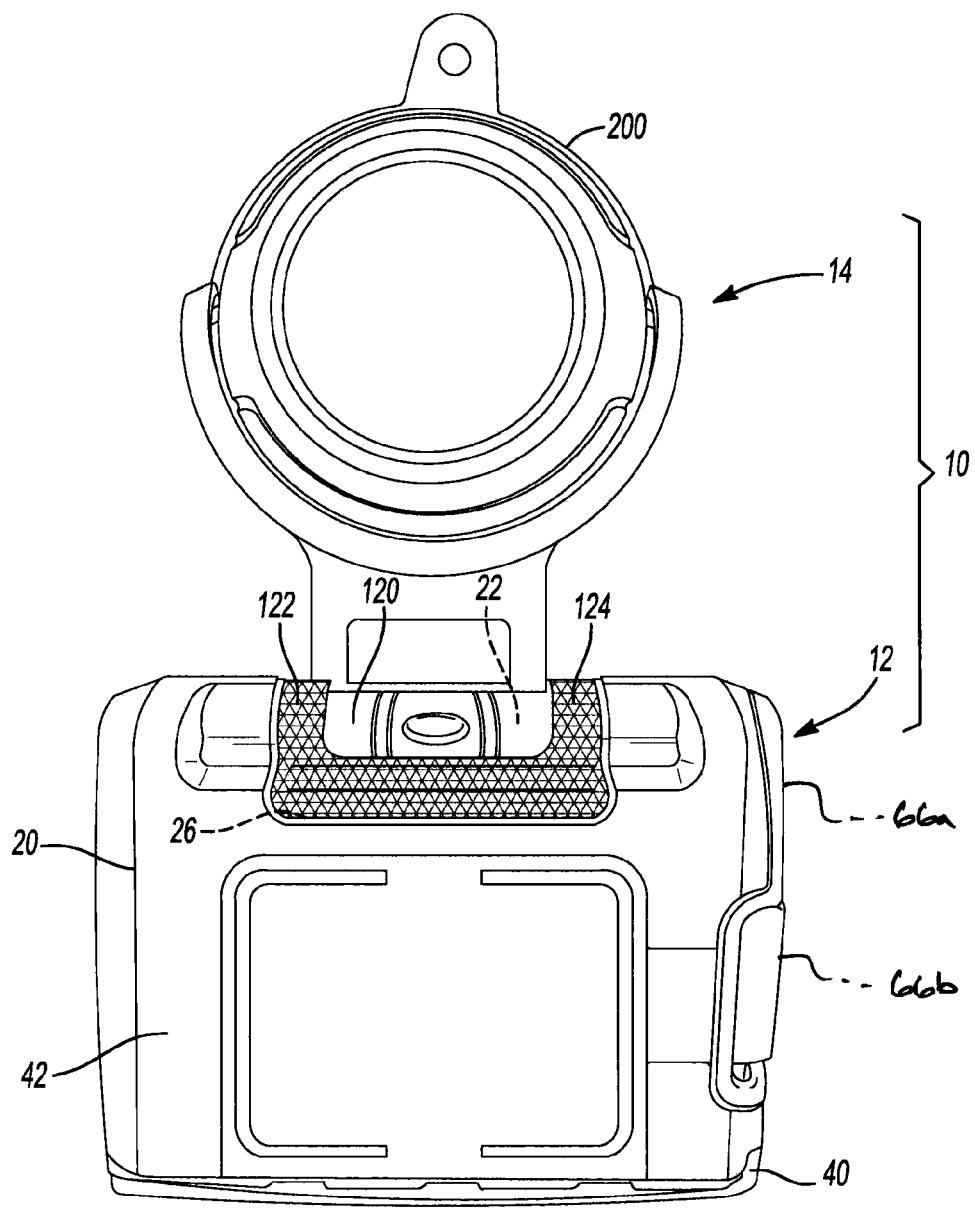
FIG. 1 is a perspective view of a tool assembly constructed in accordance with the teachings of the present disclosure, the tool assembly including a tool that is releasably coupled to a base assembly.

With reference to FIG. 1 of the drawings, a tool assembly constructed in accordance with the teachings of the present disclosure is generally indicated by reference numeral 10. The tool assembly 10 can include a tool 12 and a base assembly 14. While the tool 12 is depicted as being a laser/level in the particular example provided, those of skill in the art will appreciate that the teachings of the present disclosure have application to various other types of tools. As such, it will be understood that the scope of the present disclosure is not limited to laser/levels.

Figure 2:
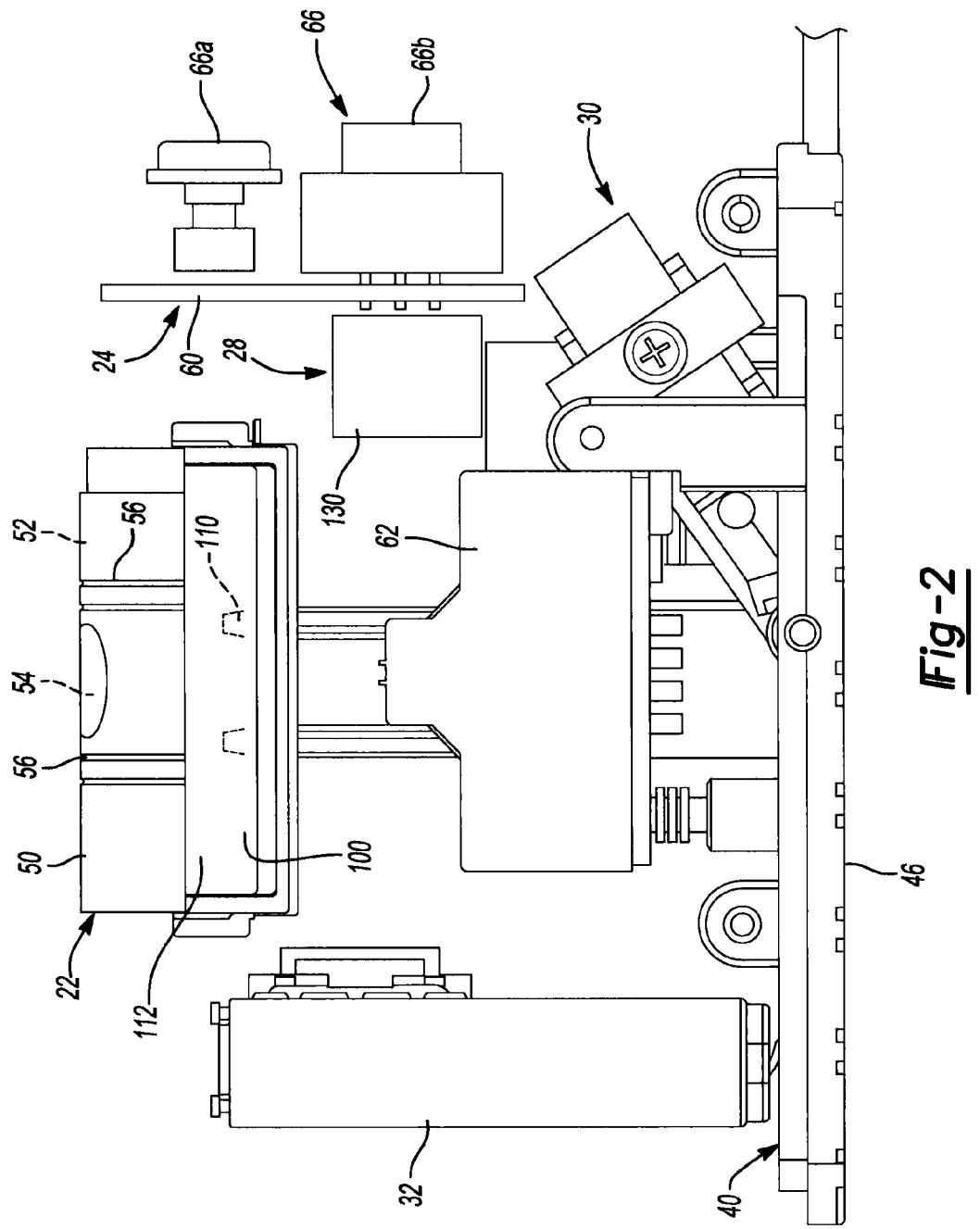
FIG. 2 is a side elevation view of a portion of the tool illustrated in FIG. 1.

With reference to FIGS. 1 and 2, the tool 12 can include a frame 20, a bubble level 22, a control assembly 24, a light system 26, an audio system 28, a laser generator assembly 30 and a power source, such as a rechargeable or disposable battery 32 that can be coupled to the frame 20. The frame 20 can be unitarily formed but in the particular example provided, includes a frame structure 40 and a housing assembly 42 that is mounted to the frame structure 40. The frame structure 40 can be formed of an appropriate plastic or metal material, such as die cast aluminum and can define a datum surface 46 and various structure to which one or more of the bubble level 22, the control assembly 24, the light system 26, the audio system 28, and the laser generator assembly 30 can be mounted. The datum surface 46 can be configured to be abutted against a workpiece to permit the tool 12 to determine a level condition as will be described in more detail below. The housing assembly 42 can be coupled to the frame structure 40 so as to form an interior cavity (not specifically shown) into which the bubble level 22, the control assembly 24, the light system 26, the audio system 28, and the laser generator assembly 30 can be received.

The bubble level 22 can include a bubble housing 50 and a fluid 52. The bubble housing 50 can be a closed structure that can be formed of a transparent material, such as plexiglass or glass, and can be fixedly coupled to the frame structure 40. The fluid 52 can partially fill the bubble housing 50 to form an air bubble 54. Levelness indicia 56 can be formed or marked on the bubble housing 50 and can be employed in conjunction with the air bubble 54 to form a gauge that is indicative of a levelness condition of the tool 12. For example, positioning of the air bubble 54 between the levelness indicia 56 can indicate a levelness condition wherein the tool 12 is in a level state.

The control assembly 24 can comprise a controller 60, which can be electrically coupled to the battery 32, and a level sensor 62. As used herein, the term controller refers to an application specific integrated circuit (ASIC), an electronic circuit, a processor (shared, dedicated or group) and memory that executes one or more software or firmware programs, a combinational logic circuit, or other suitable components that provide the described functionality. The controller 60 can be coupled to the frame 20 and can be configured to coordinate the operation of the light system 26, the audio system 28 and/or the laser generator assembly 30 and can include one or more switches 66 that permit selective operation of an associated one or ones of the light system 26, the audio system 28 and/or the laser generator assembly 30. In the particular example provided, the switches 66 comprise a power switch 66a, which is employed to selectively provide power to the controller 60, and a mode switch 66b that permits selective operation of light system 26, the audio system 28 and the laser generator assembly 30. It will be appreciated that one or more switch actuators can be movably or deflectably coupled to the frame 20 and can be configured to transmit a manual input from a user of the tool 12 to the switch or switches 66. The switch actuators can be employed to shroud the switch or switches 66 from dirt and debris and/or to prevent the switch or switches 66 from being "over traveled".

Figure 3:
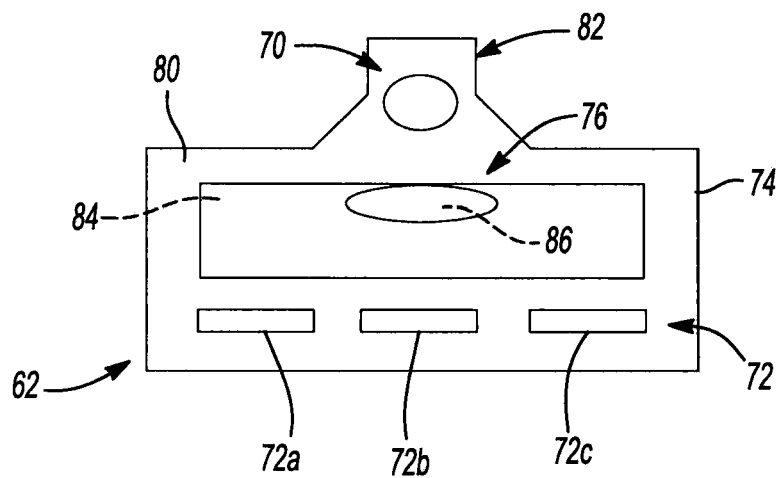
FIG. 3 is a schematic illustration of a portion of the tool illustrated in FIG. 1 illustrating a level sensor in more detail.

The level sensor 62 can be electrically coupled to the controller 60 and can be any type of sensor that can sense the levelness condition of the tool 12 and generate a level sensor signal in response thereto. With reference to FIG. 3, the level sensor 62 can comprise a source of electromagnetic radiation 70, an electromagnetic radiation sensor 72, a sensor housing 74, a bubble vial 76. The electromagnetic radiation generated by the source of electromagnetic radiation 70 can be within the visible light spectrum and/or the non-visible light spectrum and will be generically referred to herein as "light". In the particular example provided, the source of electromagnetic radiation 70 is a light emitting diode that generates infrared light. The electromagnetic radiation sensor 72 (hereinafter referred to as "the light sensor 72") is configured to receive light generated from the source of electromagnetic radiation 70 and to responsively generate the level sensor signal. In the example provided, the light sensor 72 comprises a plurality of discrete sensor elements 72a, 72b and 72c that permit the light sensor 72 to accurately identify the levelness condition of the tool 12 within a predetermined range of values. The sensor housing 74 can be formed of an opaque material, such as a black plastic, and can define a sensor cavity 80 into which the light source 70, the bubble vial 76 and the light sensor 72 can be housed. The sensor housing 74 can define a reflector 82 that is configured to direct light emitted from the light source 70 in a predetermined manner. The bubble vial 76 can be formed of a transparent material, such as plastic, and can be partly filled with a fluid 84 to form a bubble 86 therein. The bubble vial 76 can be disposed between the light source 70 and the light sensor 72 such that the light from the light source 70 travels through the bubble vial 76 prior to impinging on the light sensor 72.

During operation of the level sensor when the levelness condition of the tool 12 is within the predetermined range of values, a first portion of the light transmitted through the bubble vial 76 passes through the fluid 84, while another portion of the light passes through the bubble 86. Due to differences in the refractive properties of the fluid 84 and the gas that forms the bubble 86, the pattern of light that impinges on the light sensor 72 will change as a function of the levelness condition of the tool 12 (FIG. 1), causing a corresponding change in the light sensor signal that is responsively generated by the light sensor 72 and received by the controller 60 (FIG. 2).

Figure 4:
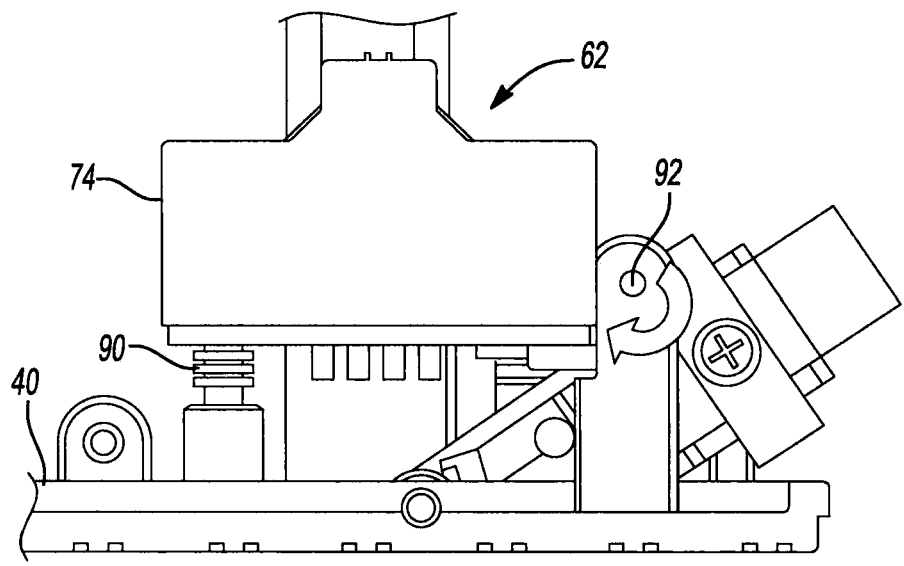
FIG. 4 is an enlarged portion of FIG. 2 illustrating the connection between the level sensor and a frame structure in more detail.

With reference to FIGS. 2 and 4, the level sensor 62 can be mounted to the frame 20 (FIG. 1) in any desired manner. For example, the level sensor 62 can be fixedly coupled to the frame 20 (FIG. 1) and thereafter calibrated in an electronic or mechanical manner such that the level sensor signal has a predetermined configuration or value when the levelness condition of the tool 12 is a level state. In the particular example provided, the level sensor 62 is calibrated mechanically by changing the orientation of the level sensor 62 relative to the frame 20 (FIG. 1). For example, the sensor housing 74 can be pivotally coupled to the frame structure 40 at a first end and supported by a jack screw 90, which can be threadably engaged to the frame structure 40, on a second, opposite end. Those of skill in the art will appreciate that the jack screw 90 can be rotated relative to frame structure 40 to change the elevation of the second end of the sensor housing 74 to thereby cause the sensor housing 74 to pivot on a pivot pin 92 relative to the frame structure 40. If desired, a means may be employed to non-rotatably secure the jack screw 90 to the frame structure 40, such as an adhesive or staking.

Returning to FIGS. 1 and 2, the light system 26 can comprise a backlight assembly 100 and a diffuser 102. The backlight assembly 100 can comprise a light source 110 and a light guide 112. The light source 110 can be electrically coupled to the controller 60 and can comprise one or more lamps or lights for generating visible light. In the particular example provided, the light source 110 comprises a first LED, which is configured to emit light of a first color, such as green light, and a second LED that is configured to emit light of a second color, such as red light. The light that is generated by the light source 110 can be directed into the light guide 112, which can be configured to transmit light into both the bubble level 22 and the diffuser 102. In the example provided, the light guide 112 is configured to direct light into the bubble level 22 over substantially all of its length (i.e., at least 80% of the length of the bubble level 22 that is visible to a user through the diffuser 102 and preferably at least 90% or 95% of this length). The diffuser 102 can be coupled to the housing assembly 42 to close off a portion of the interior cavity, such as on three adjacent orthogonal sides of the housing assembly 42 to thereby permit the bubble level 22 and/or the light that is transmitted into/through the diffuser 102 from the light source 110 to be visible from three adjacent sides of the tool 12. A first portion 120 of the diffuser 102 can be formed of a clear material that permits a user to directly view the bubble level 22, while a second portion 122 of the diffuser 102 can be textured such that light directed to an internal surface of the diffuser 102 (from the light source 110) is re-directed through and out of the second portion 122. Preferably the light emanating from the second portion 122 is relatively uniform over the area of the second portion 122. Exemplary texturing of the second potion includes a plurality of generally right rectangular or right triangular pyramid structures 124 that are configured to transmit or reflect rays of the light impinging thereon depending upon the angle of incidence of the light rays.

The controller 60 can be operated in one or more modes to control operation of the light system 26 such that the light system 26 indicates the levelness condition of the tool 12. For example, the controller 60 can operate the light system 26 such that light of the first color (e.g., green light) is generated when the tool 12 is oriented in a levelness condition corresponding to a predetermined level state (as identified at least partially though the level sensor signal that is transmitted to the controller 60), and that light of the second color (e.g., red light) is generated when the tool 12 is oriented in a levelness condition that does not correspond to the predetermined level state.

While the light source 110 has been described as being configured to selectively generate two different colors of light, it will be appreciated that the light source 110 could be configured to generate several different colors of light. As one example, the light source 110 could be configured to generate three light colors in which a first light color can be employed to indicate orientation of the tool 12 in the level state, a second light color can be employed to indicate orientation of the tool 12 in a levelness state corresponding to a first set of criteria, and a third light color can be employed to indicate orientation of the tool 12 in a levelness state corresponding to a second set of criteria. The first set of criteria could comprise a deviation between the current levelness state and the level state of a first predetermined magnitude, while the second set of criteria could comprise a deviation between the current levelness state and the level state of a second, smaller predetermined magnitude. Alternatively, the first set of criteria could comprise deviation from the level state in a first rotational direction and the second set of criteria could comprise deviation from the level state in a second, opposite rotational direction. It will be appreciated that combinations of the above two criteria could also be employed such that the color of the light generated varies depending on the rotational direction between the current levelness condition and the level state, and the deviation from the current levelness condition and the level state.

The audio system 28 can comprise a speaker 130 that can be mounted to the frame 20 and electrically coupled to the controller 60. The controller 60 can be operated in one or more modes to control operation of the audio system 28 such that the speaker 130 generates an audio signal that is indicative of the levelness condition of the tool 12. The controller 60 can be configured to control the speaker 130 such that the speaker 130 can generate a plurality of tones that are indicative of different levelness conditions, such as a first tone, a second tone and a third tone. For example, the first tone can be generated when the tool 12 is in a first tipped state (i.e., tipped relative to the level state in a first manner), the second tone can be generated when the tool 12 is in a second tipped state that is opposite the first tipped state (i.e., tipped relative to the level state in a second manner that is opposite the first manner) and the third tone can be generated when the tool 12 is in the level state.

The first, second and third tones can be different in any desired manner, such as pitch. Moreover, the first, second and/or third tones can be emitted in an intermittent manner (i.e., non-continuous) and can be repeated on a desired frequency. The frequency with which a tone may be repeated may be a pre-set and non-varying value, or may be varied based on a magnitude by which the current level condition of the tool 12 deviates from the level state. In the particular example provided, the first, second and third tones vary in pitch, the third tone is a continuous tone, and the first and second tones are intermittent with a repeating frequency that varies based on the magnitude by which the current level condition of the tool 12 deviates from the level state.

Figure 5:
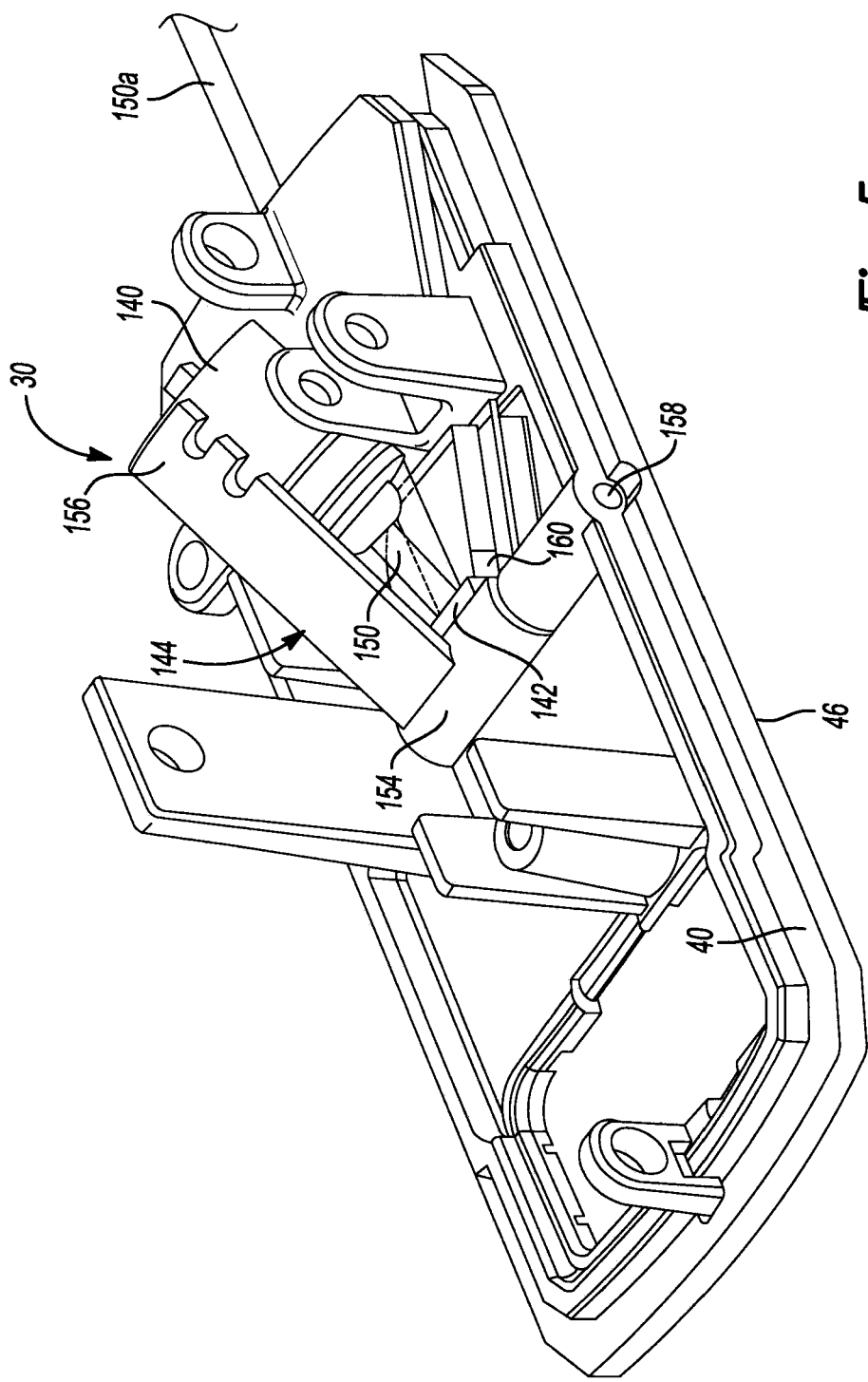
FIG. 5 is a perspective view of a portion of the tool illustrated in FIG. 1 illustrating a laser generator assembly and its connection to the frame structure.

With reference to FIG. 5, the laser generator assembly 30 can comprise a laser generator 140, a mirror 142 and a holder 144. The laser generator 140 can be any type of generator that is configured to generate a monochromatic beam of light 150. The holder 144 can be pivotally coupled to the frame structure 40 for rotation about an axis that is parallel to the datum surface 46. In the particular example provided, the holder 144 includes a generally cylindrical barrel 154, an arm 156 that extends radially outwardly from the barrel 154 and a pivot pin 158 that is employed to pivotally mount the barrel 154 to the frame structure 40. The mirror 142 can be fixedly coupled to the barrel 154 such that a reflective surface of the mirror 142 is generally tangent to the barrel 154. The laser generator 140 can be fixedly coupled to the arm 156 and oriented such that the light beam 150 generated by the laser generator 140 strikes the mirror 142 at a predetermined angle and is reflected so that the reflected beam 150a passes through a slot 160 formed in the frame structure 40. The holder 144 can be pivoted relative to the frame structure 40 to adjust an angular relationship or orientation between the reflected light beam 150a and the datum surface 46. For example, the holder 144 can be pivoted relative to the frame structure 40 such that the reflected light beam 150a is both parallel to a plane that is defined by the datum surface 46 and offset from the plane by not more than 1 mm (0.039 inch). Preferably, the plane interests the reflected light beam 150a (i.e., bisects the reflected light beam 150a longitudinally).

Any desired means may be employed to secure the holder 144 to the frame structure 40 such that the reflected light beam 150a is disposed relative to the datum surface 46 at the desired orientation. For example, an adhesive may be employed to fixedly couple the barrel 154 to the frame structure 40 when the holder 144 is positioned such that the reflected light beam 150a is disposed relative to the datum surface 46 at the desired orientation. Other suitable coupling means could be employed including fasteners, clips, and/or staking. It will be appreciated that various means may be employed to rotate the barrel 154 such that the reflected light beam 150a is disposed relative to the datum surface 46 at the desired orientation. For example, the arm 156 can be engaged by tooling (not shown) that permits a technical to selectively rotate the barrel 154, or a jack screw (not shown) could be employed to move the arm 156.

Figure 6:
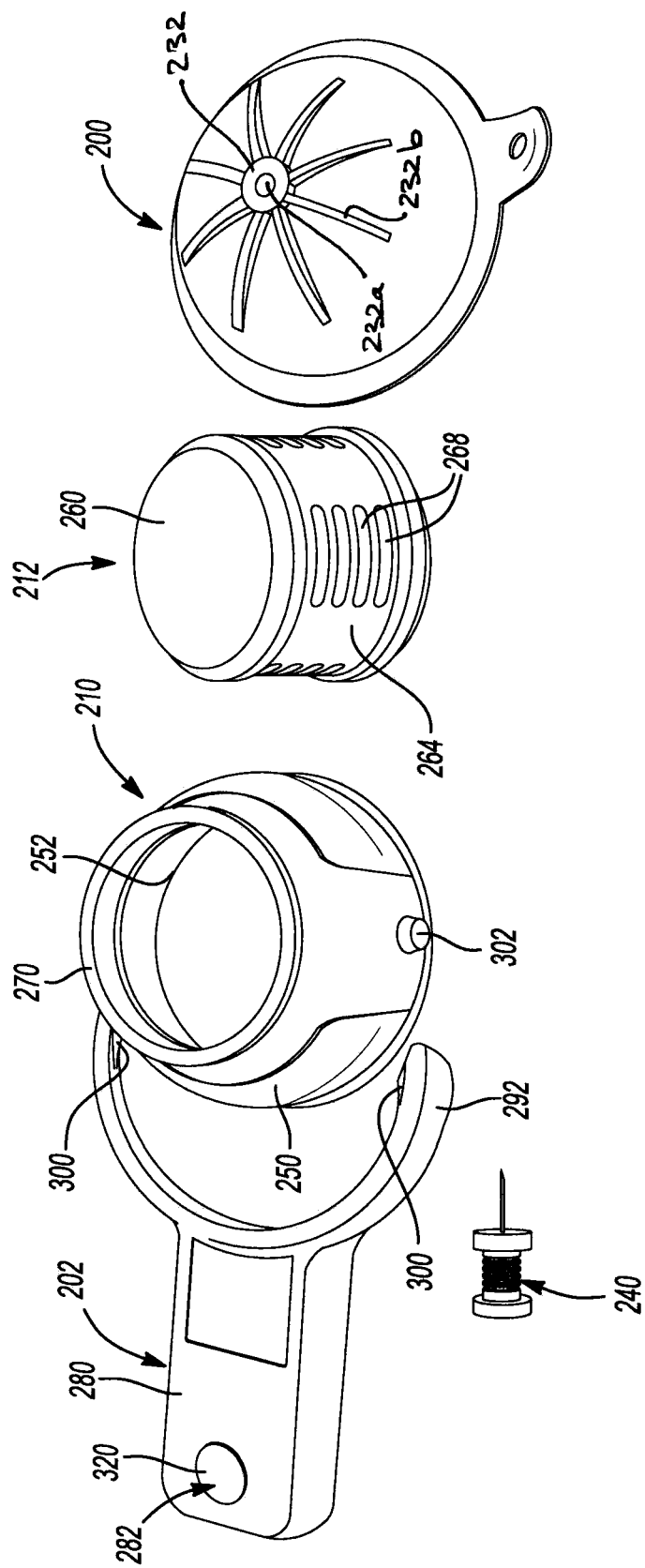
FIG. 6 is an exploded perspective view of the base assembly.
Figure 7:
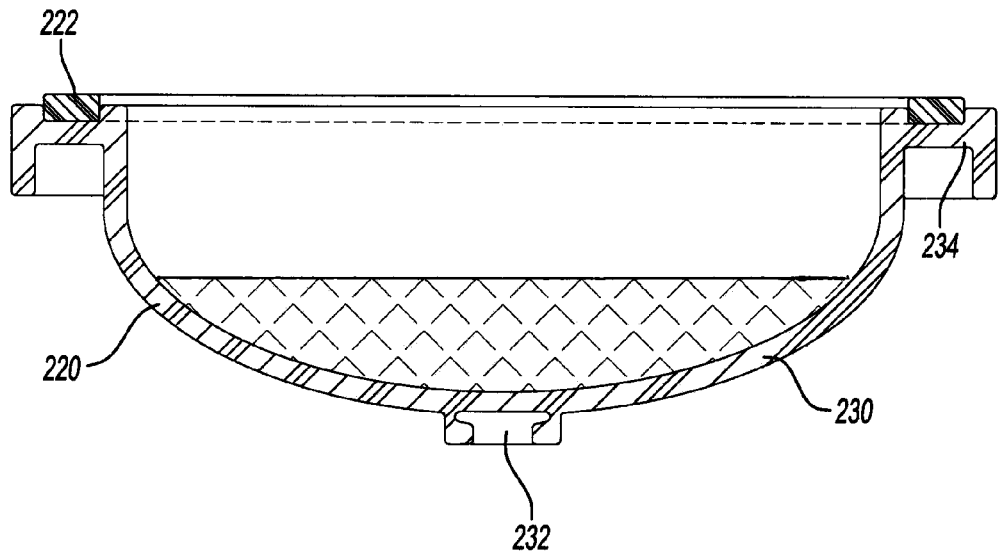
FIG. 7 is a longitudinal cross-section of a portion of the base assembly illustrating the suction cup in more detail.
Figure 8:
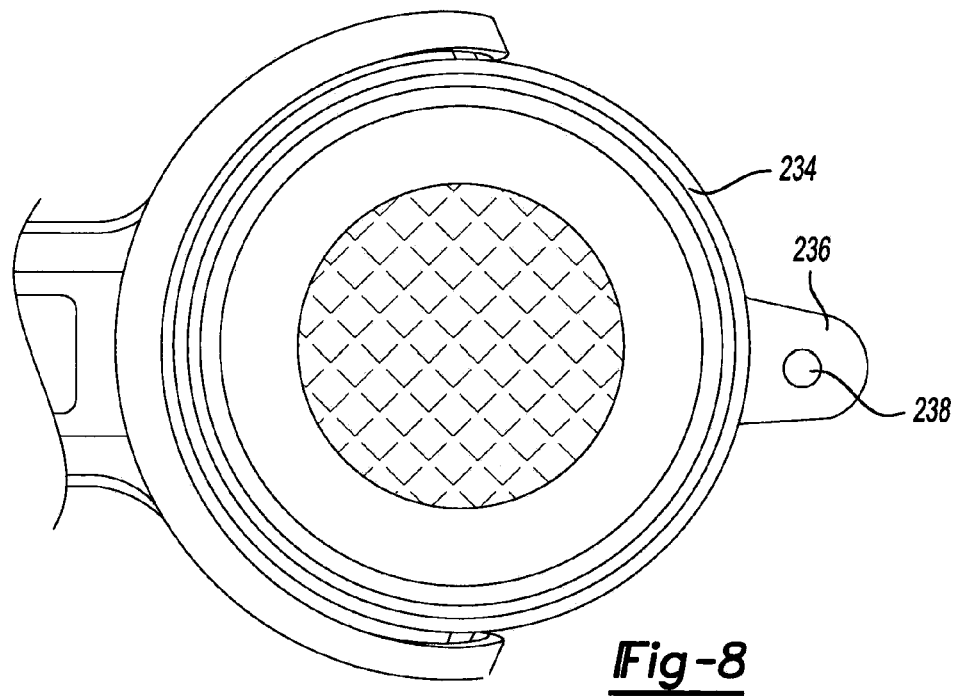
FIG. 8 is a bottom perspective view of a portion of the base assembly illustrating the suction cup in more detail.

With reference to FIGS. 1 and 6, the base assembly 14 can comprise a suction cup 200 and a coupler 202 that can include a housing 210, a plunger 212 and a tool mount 214. With reference to FIGS. 7 and 8, the suction cup 200 can comprise a cup member 220 and a seal member 222 that can be fixedly coupled to the cup member 220. The cup member 220 and the seal member 222 can be integrally formed of a resilient elastomeric material. Alternatively, the cup member 220 and the seal member 222 can be formed of different materials. For example, the cup member 220 can be formed of silicone rubber and can have a durometer that can exceed 20 Shore A, while the seal member 222 can be formed of silicone rubber or foam and can have a durometer that is less than or equal to 15 Shore A and preferably less than or equal to 10 shore A. The cup member 220 can comprise a cup structure 230, a coupling member 232, a seal flange 234 and a release tab 236. If desired, all or a portion of the interior surface of the cup structure 230 can be "textured". In the particular example provided, a portion of the interior surface of the cup structure 230 is textured with a plurality of V-shaped lines that are disposed in a circle that is centered about the coupling member 232. The seal flange 234 can extend about the perimeter of the cup structure 230. The release tab 236 can extend radially outwardly from the seal flange 234 and can have a mounting aperture 238 formed therein. The mounting aperture 238 in the release tab 236 can be configured to receive a push-pin 240 (FIG. 6) therethrough (e.g., to permit the suction cup 200 to be suspended from the work surface via the push-pin 240 (FIG. 6) in situations where the seal member 222 cannot be sealingly engaged to the work surface).

The seal member 222 can be overmolded onto the seal flange 234 so as to be cohesively bonded to the cup member 220. Alternatively, the seal member 222 can be a discretely formed seal structure, such as an O-ring, that can be fixedly coupled to the seal flange 234 in a desired manner (e.g., snap fit and/or an adhesive).

Returning to FIG. 6, the housing 210 can include a body 250 that can be configured to shroud a portion of the suction cup 200. The body 250 can define a bore 252 through which the plunger 212 can be mounted. The plunger 212 can include a head 260, a plunger mount (not specifically shown), which can be engaged to the coupling member 232 on the suction cup 200, and a plunger body 264 that can extend between the head 260 and the plunger mount and can be received through the bore 252 in the body 250 of the housing 210. If desired, the coupling member 232 on the suction cup 200 can include a socket 232a for receiving and engaging the head 260 of the plunger 212, as well as ribs 232b that be employed to stiffen the socket 232a and/or the cup structure 230.

The plunger 212 can be pressed into the housing 210 to deform the suction cup 200 to expel air from the interior of the suction cup 200 to cause the seal member 222 to sealingly engage a work surface. If the seal member 222 is configured with a durometer that is less than or equal to 15 Shore A, the seal member 222 can be sealingly engaged to work surfaces that are fairly rough but non-porous (e.g., painted drywall or painted wood). Indicia 268 may be included on the plunger body 264 that can be employed in conjunction with a gauging surface 270 defined by the housing 210 to indicate the degree to which the suction cup 200 has been deformed by the plunger 212 (i.e., the magnitude of an absolute pressure of the air in the suction cup 200). It will be appreciated that the degree to which the suction cup 200 has been deformed by the plunger 212 is indicative of the force with which the suction cup 200 is secured to the work surface. Moreover, it will be appreciated that air will leak between the seal member 222 and the work surface over time such that the force with which the suction cup 200 is secured to the work surface will diminish. Accordingly, the indicia 268 can be employed to communicate to the user a change in the magnitude of the force with which the suction cup 200 is secured to the work surface, as well as identify a situation in which the force with which the suction cup 200 is secured to the work surface is approaching or has diminished below a predetermined force. In the particular example provided, the indicia 268 is color-coded such that indicia of a first color (e.g., green) is employed to indicate that the magnitude of the absolute pressure of the air in the suction cup is greater than or equal to a first predetermined value, indicia of a second color (e.g., yellow or orange) is employed to indicate that the magnitude of the absolute pressure of air in the suction cup is less than the first predetermined value but greater than or equal to a second predetermined value, and indicia of a third color (e.g., red) is employed to indicate that the magnitude of the absolute pressure of the air in the suction cup is less than the second predetermined value. Depending on the particular values that are chosen and the for the first and second predetermined values, the indicia 268 may be color coded to indicate to a user of the tool assembly 10 (FIG. 1) situations where the suction generated by the suction cup 200 is sufficient to hold the tool assembly 10 (FIG. 1) to the work surface or is weakening to the point where the plunger 212 should be pressed to expel air from the suction cup 200 to thereby strengthen the suction generated by the suction cup 200.

Figure 9:
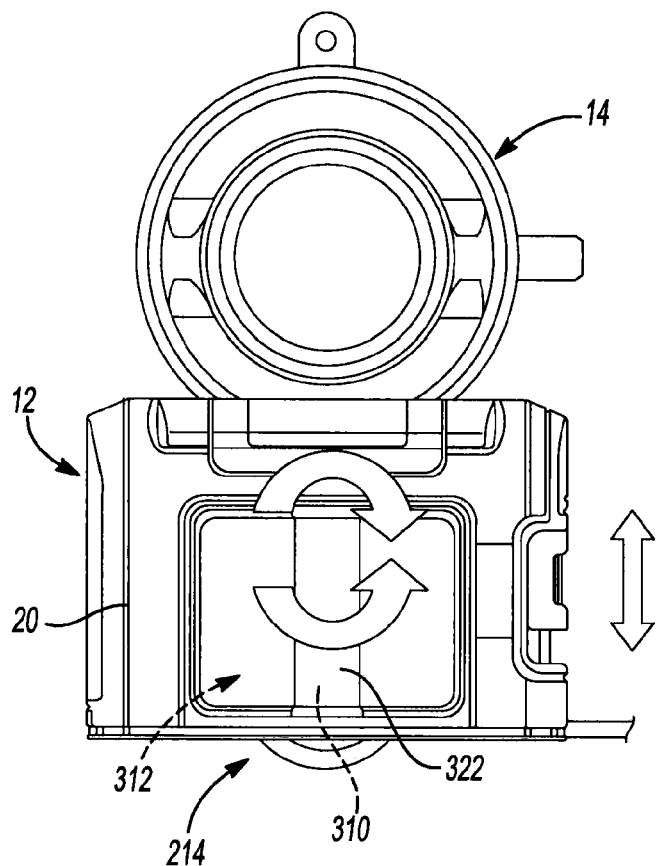
FIG. 9 is a side elevation view of the tool assembly of FIG. 1 schematically illustrating the first and second coupling means engaged to one another to releasably couple the base assembly and the tool.
Figure 10:
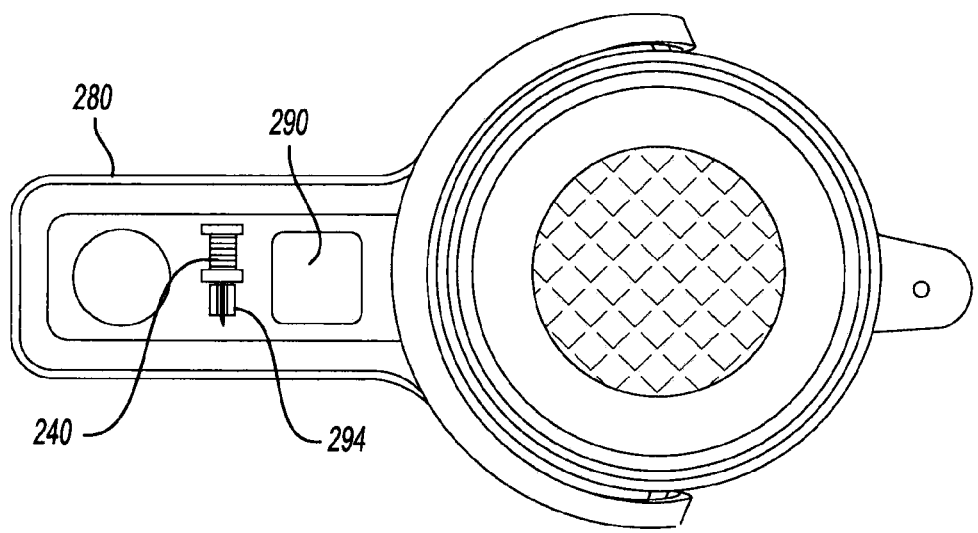
FIG. 10 is a bottom perspective view of the base assembly.

With reference to FIG. 6, the tool mount 214 can comprise a mount structure 280 and a first mounting means 282. The mount structure 280 can be coupled to the housing 210 in any desired manner. For example, the mount structure 280 could be integrally formed with the housing 210. In the particular example provided, the mount structure 280 defines a mount cavity 290 (FIG. 10), a yoke 292, and a pin mount 294 that is disposed in the mount cavity 290 (FIG. 10) and configured to releasably engage the push-pin 240 to thereby permit the push-pin 240 to be stored in the mount cavity 290 (FIG. 10). The yoke 292 can have trunnion mounts 300 that are pivotally received into trunnions 302 that are integrally formed with the body 250 of the housing 210. Accordingly, it will be appreciated that the tool mount 214 is pivotably coupled to the housing 210 in the particular example that is illustrated in the drawings. The first mounting means 282 can be coupled to the mount structure 280 and can be configured to releasably engage a second mounting means 310 (FIG. 9) that is coupled to the frame 20 to thereby facilitate releasable attachment of the tool 12 to the tool mount 214. Accordingly, it will be appreciated that various coupling means, such as hook-and-loop fasteners, could be employed for the first and second mounting means 282 and 310. The first and second mounting means 282 and 310 can be configured to permit the tool 12 to be translated relative to the suction cup 200 after the first and second mounting means 282 and 310 are engaged to one another (i.e., after the coupler 202 and a mating mount 312 (FIG. 9) on the tool 12 are engaged to one another). Preferably, the first and second mounting means 282 and 310 can cooperate to permit the tool 12 to be translated relative to the suction cup 200 in two orthogonal directions that lie in a common plane that is parallel to the work surface to which the suction cup 200 is secured. More preferably, the tool 12 can be moved in any combination of the two orthogonal directions within a predetermined range (i.e., over a predetermined area). The first and second mounting means 282 and 310 may additionally permit the tool 12 to be rotated about an axis that is perpendicular to the common plane. While the first and second mounting means 282 and 310 have been described herein as comprising a magnet 320 and at least one magnetically susceptible target (e.g., steel plate 322 (FIG. 9)), respectively, it will be appreciated that the magnet 320 and the magnetically susceptible target could be coupled to the tool 12 and the mount structure 280, respectively, in the alternative. Moreover, it will be appreciated that two or more steel plates 322 (FIG. 9) could be employed on two or more sides of the tool 12 to permit the orientation of the tool 12 to be changed as desired. For example, the steel plates 322 (FIG. 9) could be coupled to opposite sides of the frame 20 to permit the reflected beam 150a (FIG. 5) to be selectively projected from one lateral side of the base assembly 14 or the other. Accordingly, the manner in which the mating mount (e.g., steel plates 322 (FIG. 9)) engages the mount (e.g., magnet 320) is the same when the first and second sides of the tool are mounted to the base assembly.

While the tool mount 214 has been illustrated and described herein as including a yoke 292, those of skill in the art will appreciate that the invention, in its broadest aspects, could be configured somewhat differently. For example, the tool mount could comprise a portion of the housing of the coupler that can be configured to engage a bore formed in the frame of the tool. The bore could be formed, for example, in the center of the tool and can be configured to engage the tool mount via a light interference fit so that the tool may be spun about the suction cup and the housing of the coupler.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tool assembly comprising:
    a frame that defines a datum surface;
    a bubble level mounted to the frame, the bubble level being configured to indicate a levelness condition of the tool assembly;
    a controller coupled to the frame;
    a light system coupled to the frame, the light system comprising a light source and a diffuser, the controller being configured to selectively control the light source based on the levelness condition of the tool assembly such that the light source generates light of a first color when the levelness condition of the tool assembly is a first condition and generates light of a second, different color when the levelness condition of the tool assembly is a second, different condition, the diffuser receiving light generated by the light source and being disposed about the bubble level such that the light generated by the light source emanates around the bubble level from three adjacent sides of the tool assembly.

2. The tool assembly of claim 1, further comprising a laser generator coupled to the frame, the laser generator configured to generate a laser beam that is disposed relative to the datum surface at a predetermined orientation.

3. The tool assembly of claim 1, wherein the diffuser includes a first portion and a second portion, the first portion being formed of a clear material that permits a user to directly view the bubble level, the second portion being textured such that light directed at a surface of the diffuser is re-directed such that the light is transmitted to other portions of the second portion.

4. A tool assembly comprising:
    a frame that defines a datum surface;
    a bubble level mounted to the frame, the bubble level being configured to indicate a levelness condition of the tool assembly; and
    a light system coupled to the frame, the light system comprising a light source and a light guide that backs the light source, the light guide being configured to receive light from the light source and direct the light into the bubble level such that the bubble level is illuminated over substantially all of its length;

wherein the light source comprises a first lamp and a second lamp, the first lamp being configured to emit light of a first color, the second lamp being configured to emit light of a second color, wherein the first and second lamps are configured to be illuminated in response to the levelness condition of the tool assembly.

5. The tool assembly of claim 4, further comprising a laser generator coupled to the frame, the laser generator configured to generate a laser beam that is disposed relative to the datum surface at a predetermined orientation.

6. A tool assembly comprising:
a frame that defines a datum surface;
a laser generator assembly having a laser generator, a mirror and a holder, the laser generator being mounted to the holder and configured to output a beam of light, the mirror being mounted to the holder at a predetermined angle relative to the beam of light, the holder being pivotally mounted to the frame to permit the beam of light to be moved relative to the datum surface.

7. The tool assembly of claim 6, wherein the laser generator assembly is configured to permit the beam of light to be oriented relative to the datum surface such that the beam of light is both parallel to a plane that is defined by the datum surface and offset from the plane by not more than 1 mm (0.039 inch).

8. The tool assembly of claim 7, wherein the plane intersects the beam of light.

9. A tool assembly comprising:
a frame that defines a datum surface;
a controller coupled to the frame; and
an audio system coupled to the frame, the audio system including a speaker, the controller being configured to identify a levelness state of the tool assembly and to control the speaker in response thereto, wherein the speaker generates a first tone when the tool assembly is in a first tipped state and a second, different tone when the tool assembly is in a second tipped state that is opposite the first tipped state, wherein a level condition of the tool assembly is disposed between the first and second tipped states.

10. The tool assembly of claim 9, wherein the first and second tones are different in pitch.

11. The tool assembly of claim 10, wherein each of the first and second tones is of an intermittent duration and is repeated on a frequency that is based on a magnitude by which the tool assembly deviates from a level state.

12. The tool assembly of claim 11, wherein the speaker generates a third tone that is different from the first and second tones when the tool assembly is in the level state.

13. The tool assembly of claim 12, wherein the third tone is a continuous tone.

14. A tool assembly comprising:
a base assembly having a suction cup and a mount, the suction cup being configured to be releasably coupled to a surface, the mount being coupled to the suction cup;
a tool device; and
a mating mount coupled to the tool device, the mating mount being configured to be engaged to the mount to releasably couple the tool device to the base assembly, the mating mount cooperating with the mount to permit the tool device to be translated relative to the suction cup after the mating mount is engaged to the mount;
wherein the tool device comprises a laser generator and a bubble level.

15. The tool assembly of claim 14, wherein the mating mount and the mount cooperate to permit the tool device to be translated in two orthogonal directions that lie in a common plane that is parallel to the surface.

16. The tool assembly of claim 15, wherein the tool device is movable in any combination of the two orthogonal directions within a predetermined range.

17. The tool assembly of claim 16, wherein the mating mount and the mount cooperate to additionally permit the tool device to be pivoted about an axis that is perpendicular to the common plane.

18. The tool assembly of claim 17, wherein one of the mount and the mating mount comprises a magnet and the other one of the mount and the mating mount comprises a magnetically susceptible target.

19. The tool assembly of claim 14, wherein the mating mount permits a first side of the tool device to be selectively mounted to the base assembly to permit the laser generator to project a beam of light in a first direction relative to the base assembly, the mating mount also permitting a second, opposite side of the tool device to be mounted to the base assembly to permit the laser generator to project a beam of light in a second, opposite direction relative to the base assembly.

20. A tool assembly that is configured to be removably coupled to a surface, the tool assembly comprising:
a base assembly having a suction cup, a housing and a plunger, the housing being disposed about at least a portion of the suction cup, the plunger being translatable along an axis relative to the housing to deform the suction cup when the suction cup is abutted to the surface such that air disposed between the suction cup and the surface is expelled from the suction cup, the plunger having coded indicia indicative of at least three levels of a pressure of the air in the suction cup; and
a tool that is removably coupled to the base assembly, the tool comprising a laser generator and a bubble level.

21. A tool assembly comprising:
a base assembly having a mount; and
a tool having a laser generator and a mating mount that is configured to be engaged to the mount to releasably couple the tool to the base assembly, the mating mount cooperating with the mount to permit a first side of the tool to be selectively mounted to the base assembly to permit the laser generator to project a beam of light in a first direction relative to the base assembly, the mating mount also cooperating with the mount to permit a second side of the tool to be selectively mounted to the base assembly to permit the laser generator to project a beam of light in a second, different direction relative to the base assembly;
wherein the manner in which the mating mount engages the mount is the same when the first and second sides of the tool are mounted to the base assembly; and
wherein the second side of the tool is not in direct contact with the base assembly when the first side of the tool is mounted to the base assembly, and wherein the first side of the tool is not in direct contact with the base assembly when the second side of the tool is mounted to the base assembly.

22. The tool assembly of claim 21, wherein the base assembly includes a suction cup that is configured to secure the base assembly to a surface.

23. The tool assembly of claim 22, wherein the tool further comprises a bubble level that is oriented in a predetermined manner relative to the beam of light generated by the laser generator.

24. The tool assembly of claim 23, wherein the mating mount cooperates with the mount to permit the tool to be translated relative to the suction cup after the mating mount is engaged to the mount.

* * * * *